United States Patent [19]

Gelardi et al.

[11] Patent Number: 5,114,092
[45] Date of Patent: May 19, 1992

[54] LOW COST VIDEO CASSETTE

[75] Inventors: Paul J. Gelardi; John A. Gelardi; David A. Capotosto, all of Cape Porpoise, Me.

[73] Assignee: Paul J. Gelardi, Kennebunkport, Me.

[21] Appl. No.: 639,516

[22] Filed: Jan. 10, 1991

[51] Int. Cl.⁵ .................... G11B 23/04; G11B 23/87
[52] U.S. Cl. .................... 242/199; 360/132; 206/387
[58] Field of Search .............. 242/198-200; 360/132; 206/387

[56] References Cited

U.S. PATENT DOCUMENTS

| | | | |
|---|---|---|---|
| 3,712,559 | 1/1973 | Schwartz | 242/199 |
| 4,249,710 | 2/1981 | Dobbs et al. | 242/199 |
| 4,494,161 | 1/1985 | Ogata et al. | 360/132 |
| 4,602,303 | 7/1986 | Pertzsch et al. | 360/132 |
| 4,629,144 | 12/1986 | Schoettle | 360/132 |
| 4,662,579 | 5/1987 | Gelardi et al. | 242/199 |
| 4,683,511 | 7/1987 | Kara | 360/132 |
| 4,706,149 | 11/1987 | Machida et al. | 242/199 |
| 4,763,218 | 8/1988 | Westfall et al. | 360/132 |
| 4,802,048 | 1/1989 | Perkins et al. | 242/199 |
| 4,842,217 | 6/1989 | Vinson | 242/199 |
| 4,848,698 | 7/1989 | Newell et al. | 242/199 |
| 4,883,176 | 11/1989 | Hart et al. | 242/199 |
| 4,899,242 | 2/1990 | Hashizume et al. | 360/132 |
| 4,969,612 | 11/1990 | Thomas | 242/199 |

FOREIGN PATENT DOCUMENTS

| | | |
|---|---|---|
| 125688 | 5/1984 | European Pat. Off. . |
| 0285384 | 10/1988 | European Pat. Off. . |
| 0417969 | 3/1991 | European Pat. Off. . |
| 8700321 | 10/1988 | PCT Int'l Appl. . |
| 9006669 | 5/1991 | PCT Int'l Appl. . |

Primary Examiner—Daniel P. Stodola
Assistant Examiner—John Q. Nguyen
Attorney, Agent, or Firm—James Creighton Wray

[57] ABSTRACT

A low cost video cassette has a base formed of a generally flat wall portion, with sloped converging front walls spaced inward from a front edge and with flat tape guiding walls extending upward from medial, generally rectangular projections of the base. Tape guide roller support pins are mounted on forward projections near lateral portions of the base. Tape reel guides are molded in the base. Integrally formed tape reel locks have operators extending into a groove formed in the plane of the base for receiving an actuator which extends into, but not beyond, the plane of the base. The rear wall has an upward-extending recess and a frangible anti-record tab extending downward within the recess. Rectangular openings are formed medially in the cover. Flaps are hinged to the openings. Cantilevered leaf springs connected along outer edges of the openings or to the flaps extend toward the base wall when the flaps close the openings to urge tape reels downward. A dust cover is connected to the short living springs. A spring connected to the cover and connected to another portion of the cassette holds the cover at a generally downward position. A latch integrally formed on a living hinge has an outward actuator-receiving portion for releasing the latch, and a parallel outward-extending latching portion for engaging an inner ledge on an inner end of a side wall of the dust wall. The latch has an upward extension for engaging an inner surface of the dust door and moving the latch outward as the dust door is closed.

19 Claims, 6 Drawing Sheets

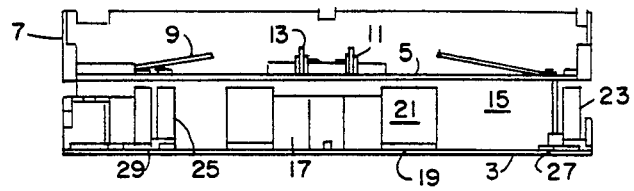
FIG. 1
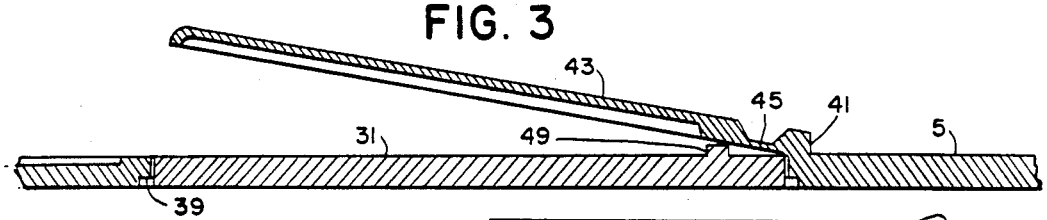
FIG. 3
FIG. 2
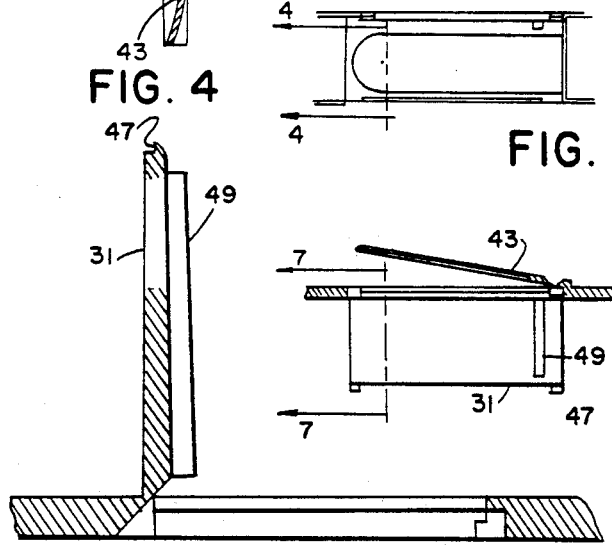
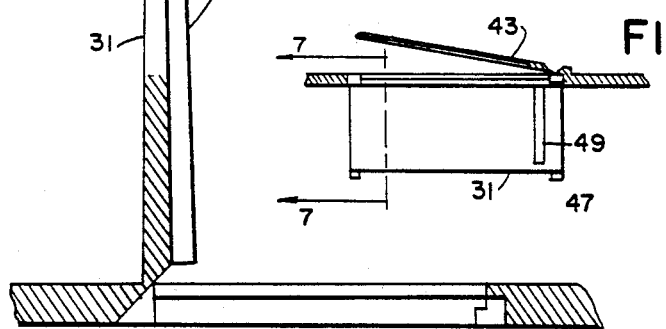
FIG. 8
FIG. 4
FIG. 5
FIG. 6
FIG. 7

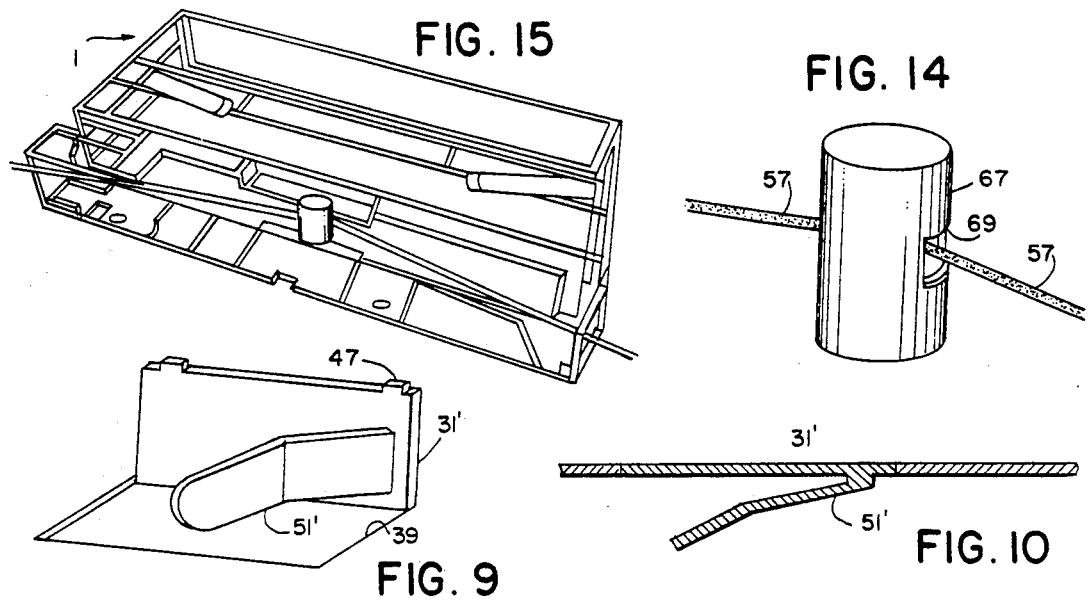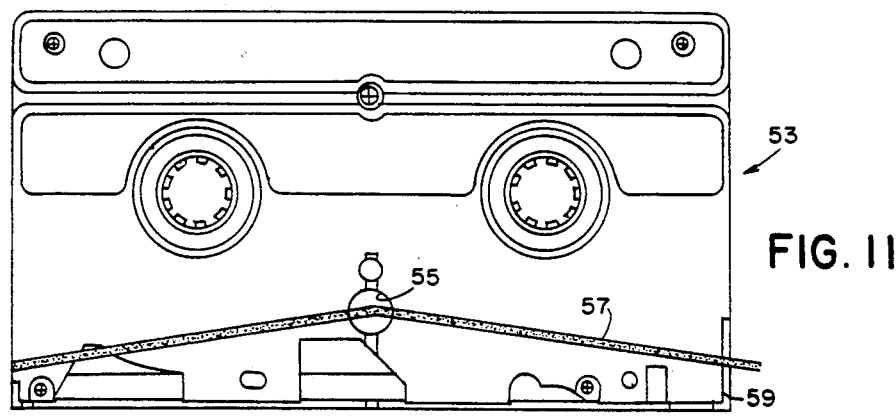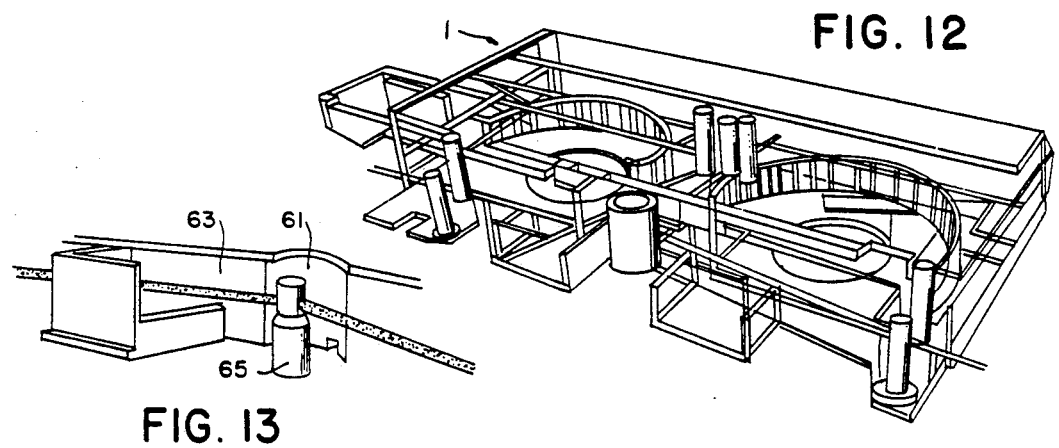

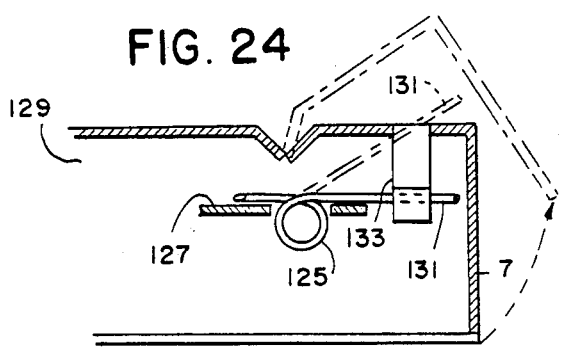
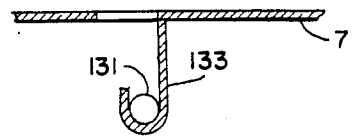
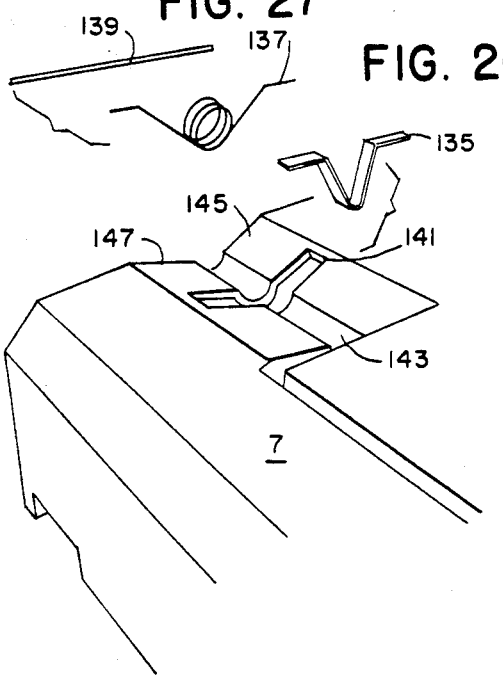
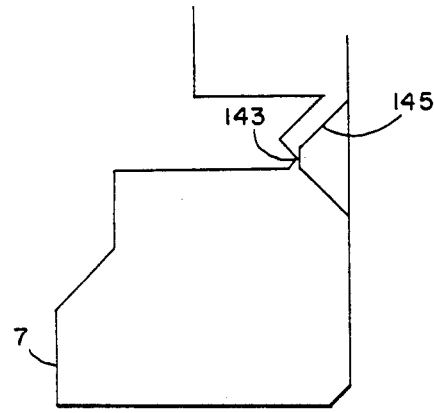
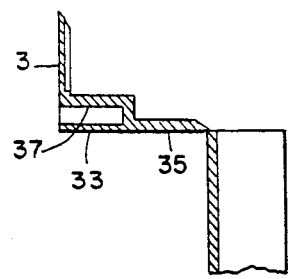
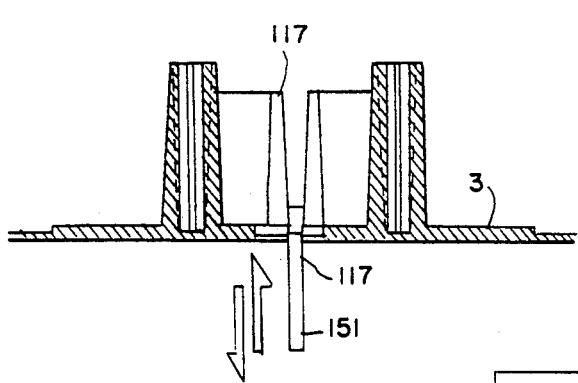
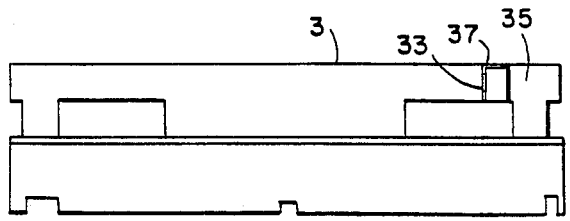

LOW COST VIDEO CASSETTE

BACKGROUND OF THE INVENTION

Video cassettes and video cassette players and recorders (VCR's) have wide popularity in the United States and throughout the world.

Many video cassettes are used over and over again, such as, for example, rental video cassettes. Other video cassettes have fewer uses, such as cassettes that are used for stored records that may be used only a few times, for example, less than ten.

Other cassettes have even fewer uses, for example, those that may be widely distributed for advertising. Single or small use cassettes must be made as inexpensive as possible so that the entire package of cassette, reels and recorded tape for holding low use products, such as advertising tapes, may be controlled.

Current cassettes contain a large number of parts, which require several separate manufacturing and assembly steps. A large number of materials go into making up those parts. When it becomes time to discard the cassettes, the products are often crushed and discarded in landfills. Recycling, because of the various materials, is too expensive and difficult.

A need exists for a cassette which is a high quality cassette and which may be quickly and easily made with few steps and which may be conveniently recycled.

SUMMARY OF THE INVENTION

The present invention seeks to overcome the problems of the prior art by providing a high quality cassette which is made at a low cost, and by providing a cassette which is made substantially of entirely the same materials and with few parts, so that the cassette may be made at a low cost and may be recycled usefully, simply by pulling out the tape.

A low cost video cassette of the present invention has a base formed of a generally flat wall portion, with sloped converging vertical front walls spaced inward from a front edge. Flat tape guiding walls extend upward from medial, generally rectangular projections of the base. Tape guide roller support pins are mounted on forward projections near lateral portions of the base. The vertical, inward and rearward sloping frontal wall are spaced from the tape handling area. The base further has tape reel guides molded in the base, and has integrally formed tape reel locks extending on pin-hinges oriented perpendicular to the base. The locks have operators extending into a groove formed in the plane of the base for receiving an actuator which extends into the plane of the base.

An upstanding rear wall is mounted along a rear edge of the base, and the rear wall has an upward-extending recess and a breakable anti-record tab extending downward within the recess along an outer plane of the rear wall.

A living hinge is formed at the top of the rear wall, and a cover extends forward from the living hinge. The cover has inward-extending alignment guides and grippers for cooperating with upward-extending features on the base. Rectangular openings are formed medially in the cover wall and extend inward from edge portions. Flaps are hinged to the openings parallel to the living hinge which attaches the cover to the rear wall. The flaps have connectors on free edges for connecting to opposite edges of the opening. Integrally formed, cantilevered leaf springs are connected along outer edges of the openings or to the flaps for extension toward the base wall. When the flaps close the openings the springs urge tape reels downward toward the base. The cover has forward-extending extensions with grippers for gripping complementary upper ends of roller-mounting pins to hold the cassette assembled. The cover has downward extensions near opposite edge portions and living springs at lower extremities of the downward extensions. A dust cover is connected to the short living springs for extending downward over the tape-guiding walls and roller-receiving pins for covering a tape-exposing area of the cassette. A spring connected to the cover and connected to another portion of the cassette holds the cover in a generally downward position. A latch integrally formed on a living hinge at the top of an upward extension from the base has an outward actuator-receiving portion for releasing the latch, and a parallel outward-extending latching portion for engaging an inner ledge on an inner end of a side wall of the dust wall. The latch has an upward extension for engaging an inner surface of the dust door and for moving the latch outward as the dust door is closed.

A preferred low cost video cassette has an integrally molded base. A rear wall is connected to the base and extends upward from the base. A cover is hinged to the top of the rear wall by an integrally formed living hinge. First and second springs are integrally formed with the cover for pressing tape reels downward toward the base. First and second elongated flaps are integrally formed with the cover, are hinged along one edge to the cover and are attachable along opposite edges to opposite edges of cover openings for overlying the springs and forcing the springs downward into engagement with the reel hubs.

Preferably the cover is formed with first and second rectangular openings, and the springs extend inward from outer edges of the openings. Preferred springs are hinged to lugs stepped downward from the openings. Preferably the cover further has a fulcrum bar for engaging the spring adjacent the spring hinge.

In one embodiment, a compound curved spring has one end connected to the hinge, has a bent central portion and has an opposite free end for contacting the reel.

In another embodiment, the spring is connected to the cover flap and is molded in profile on the cover flap for projecting downward into the cassette toward a reel.

A preferred base has a step approximately equal to the thickness of the base. Integrally molded oppositely extending reel locks are connected to the base. The reel locks have actuator sections extending into the step, whereby the reel lock actuators are contacted and moved by the operator as the brake release pin enters the shell wall.

A preferred tape door is connected to edges of the cover remote from the back wall by living hinges. A dust door latch is integrally molded on an upward extension from the base and is connected thereto by a living hinge for latching one side of the dust door and holding the dust door in a closed position. The latch further includes a return arm extending toward the dust door from the latch for contacting by the dust door as the dust door is returned to the closed position, and for forcing the latch outward into latching contact with an internal ridge on an inside of the dust door.

Preferably the dust door latch is pivoted laterally about a first hinge for selective engagement and disengagement with the dust door ridge. The return arm is spaced inward from the latch, and the latch and return arm are cantilevered forward from the hinge.

In a preferred embodiment, the base and cover are made of translucent material, and a light screen is connected to a forward portion of the base for screening tape signalling light when the VCR is in use. Preferably the light screen comprises opaque coatings on or pigments in or components added to the translucent cassette body.

In one embodiment, the screen comprises an opaque partial cylinder with a closed top and holes or covered channels which screen all but direct sensing light in a defined direction of light source receivers.

The preferred cassette further includes an opaque cylinder with a closed top and holes or covered channels which screen all light except direct sensing light in defined directions of light source receivers.

In one embodiment, the screens are first and second opaque screen walls which are snapped, pressed or welded into the cassette shell, and which have holes positioned to allow direct light from a sensing light source to shine on receivers, and which screen out all other light.

Another preferred light screen is selected from opaque light screening labels, paints or pigments which are applied to the cassette for blocking out light, except for direct light from a light source through a window in the screen in front of the sensing light receiver. The opaque materials are coated on, incorporated in or fitted into the cassette and are opaque to sensing light which may be outside of the visual light range.

Preferably a straight spring is connected at a first longitudinal end to a dust door, and extends for a distance inside the cover toward the back wall. A second end is secured beneath the cover for extending and compressing along the cover and tending to close the dust door.

In another embodiment, a spring is held in a pocket on the base and is connected to the cover for holding the cover downward.

Another preferred spring is secured to the cover.

One embodiment has downward extending ledges along opposite sides of a front edge of the cover opposite the living hinge to the rear wall, and a dust door connected to living hinges at lower extremities of the extensions. The extensions and the dust door living hinges form integral hinges attached only at opposite end portions of the front edge of the cover, and not in the middle of the cover.

In a preferred embodiment, a record tab recess formed in the rear wall extends upward from an opening in the bottom wall. A recording and blocking tab formed on the rear wall extends downward in the record tab opening to a position near the bottom wall.

In a preferred cassette, the base includes first and second tape guides and a forward wall extended inward from a front edge of the base. Generally rectangular projections extend forward from the front wall for guiding the tape.

Preferably the forward projections are generally rhombic projections with rectangular forward edges and rectangular tape guides extending upward from the forward edges positioned near the middle of the front wall. A generally triangular form lateral extension with an integrally formed upward extending tape guide pin receives and supports a tape guide ruler along one edge portion of the front wall. A forward, generally rectangular projection has at one corner thereof a second tape guide pin extending vertically upward therefrom for receiving a second tape guide roller. A recess along one edge receives a dust door latch.

The molding of the reel leafs require that there be openings molded in the cover of the cassette shell. These openings, if not covered, will allow contaminates into the cassette causing signal dropouts. The addition of the cover flaps allows there to be integrally molded hard covers to the openings which hinge and snap shut, sealing the cover of the cassette without the necessity of adding hard windows, clear film windows or other additional pieces. The cover flaps also allow the molding of "limp" reel leafs, which only become active springs when the cover flaps are shut.

"Limp" hinged leafs do not act as springs until activated by the closing of the cover flaps. In the compound spring version, the hinged leaf is pressed against the back of the window. In the straight ramped version, straight leafs are deflected or reinforced by a fulcrum in the form of a rib, ramp or bar molded on the inside of the cover flaps. Contoured reel leafs allow the spring force of the leafs to be increased with a minimum amount of additional plastic, and without the leafs bending in the center.

An alternate reel leaf spring design molds an attached reel leaf spring in profile to a cover flap, which pivots into position as the cover flaps are closed and snapped shut.

The reel lock retractor is molded so that the actuation of the reel locks is done within the shell wall thickness. The actuator pin does not contact the retractor through a hole in the shell.

Plastic springs can creep under load. The door latch incorporates a return arm on the latch which interfaces with the dust door. When the cassette is inserted into a VCR, a device releases the door latch and allows the dust door to be opened. If the cassette is left for a protracted period of time in the VCR, a plastic spring can creep under load and return slowly to its locking position or not at all. A return arm is connected to the door latch, which contacts the dust door in the closed position. The door latch relies on the flexibility of the return arm to provide the door latch spring force. Once the door latch is released and the door is opened by the machine, the pressure is relieved from the return arm so that the arm itself is not under load when in the VCR. When the door is closed, either by the door spring force or by the mechanical action of the VCR, the dust door contacts the return arm of the door latch and pivots the door latch back into the locking position.

VCR's utilize a special light source to sense the clear leader at the beginning and end of the tape. Transparent, translucent and certain colored cassette shells do not adequately screen out the light source light and can incorrectly trigger the light source receivers, telling the VCR that the tape is either at the beginning or end of tape.

There are marketing and design advantages to transparent, translucent and colored cassette shells which have not been available because of this design limitation.

The present invention provides light screening components and materials (including paints and pigments) which can be added to conventional as well as the low cost video cassette design and which will screen the light and allow the correct functioning of the light sensing features of the VCR. Partial or full opaque screening cylinders may be snapped, pressed, welded or formed in the cassette cover or base, or both.

The partial cylinder version for the low cost video cassette uses an opaque partial cylinder with a closed top and holes or covered channels which screen all but direct light in the defined direction of the light source receivers.

The full cylinder version, which can be used for both the low cost video cassettes of the present invention and conventional VHS cassettes, is comprised of an opaque cylinder design, with a closed top and holes or covered channels which screen all light source light except direct light in the defined direction of the light source receivers.

The side wall version, which can be used for both the present low cost video cassette and conventional VHS cassettes, employs the use of two opaque screening walls, which are snapped, pressed or welded into the cassette shell, and which have holes positioned in them to allow direct light from the light source to shine on the receivers, but which screen out all other "stray" light. Alternatively, opaque, light screening labels, paints, or pigments may be applied which block out light, except direct light from the light source through a small "window" in front of the light source receiver.

The straight wire version is a straight wire (spring steel or plastic) which is fixed under the dust door, which runs for a distance inside the cover, and whose opposite end is loosely held in position in proximity to the inside surface of the cover but is free to travel in the longitudinal direction as the door is opened and closed.

The internal coil version uses a coiled spring which snaps into a pocket in the base portion of the cassette. After the cover portion is closed, the free end of the coil spring latches onto a catch on the underside of the dust door.

The cassette incorporates a modified base profile eliminating unnecessary plastic, reducing the projected area of the molded part and reducing the mold clamping force required to mold the part.

The record tab area of the one piece low cost video shell allows the molding of the record tab without the need for side actions or swipe shutoffs.

An interrupted integral hinged door is attached only at the ends and not in the middle.

These and further and other objects and features of the invention are apparent in the disclosure, which includes the above and ongoing written specification, with the claims and the drawings.

BRIEF DESCRIPTION OF THE DRAWINGS

FIG. 1 is a front elevation of a low cost video cassette made according to the present invention.

FIG. 2 is an opposite end elevation in inverted position.

FIG. 3 is a detail of a tape reel spring and cover flap.

FIG. 4 is a cross-sectional detail of the spring shown in FIGS. 3 and 5.

FIG. 5 is a bottom elevation of a spring and flap shown in FIGS. 3 and 4.

FIG. 6 is a detail of the spring and flap in molded position.

FIG. 7 is an edge view detail of the flap.

FIG. 8 is a detail of an alternate spring.

FIG. 9 is a detail of an alternate spring integrally molded with the flap.

FIG. 10 is a cross-sectional detail of the spring and flap shown in FIG. 9.

FIG. 11 is a schematic representation of a tape cassette showing a clear tape leader-sensing light path.

FIG. 12 is a schematic perspective view of the sensing light path in relation to a cassette of the present invention.

FIG. 13 is a detail of a sensing light path and a light source.

FIG. 14 is a detail of a partial or full cylinder which surrounds the light source.

FIG. 15 is a perspective view of the cylinder shown in FIG. 14 in relation to the cassette of the present invention.

FIG. 24 is a schematic detail of an alternate dust door closing spring.

FIG. 25 is a detail of elements shown in FIG. 24.

FIG. 26 is an alternate form of dust door spring.

FIG. 27 shows alternate details of dust door springs.

FIG. 28 is a detail of a dust door hinge of the present invention.

FIG. 29 is a detail of a retractor pin operating within the wall thickness of the base to move reel brake retractors.

FIGS. 30 and 31 are cross-sectional and inverted rear elevational details of a record-preventing tab positioned in front of a record sensor arm well, which extends upward from a base of the cassette.

DETAILED DESCRIPTION OF THE DRAWINGS

Figure 16:
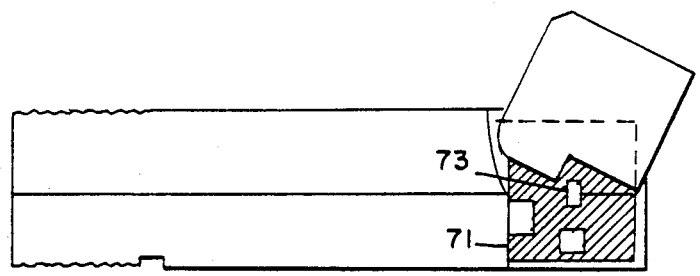
FIG. 16 is a detail of an opaque light screen within a translucent cassette.
Figure 17:
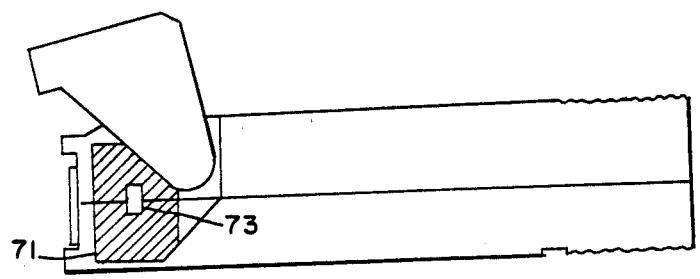
FIG. 17 is an opposite view of an opaque light screen with a clear window.

Referring to FIG. 1, a low cost video cassette is generally indicated by the numeral 1. The cassette has a base 3 and a cover 5. In the molded configuration as shown in FIG. 1, the cover surface is stepped upward from the base. A dust door 7 is integrally formed in a cover. Reel hub springs 9 are integrally formed in the cover, and locator pins 11 on stanchions 13 are also integrally formed in the cover. Also visible in FIG. 1 are the recessed front walls 15 and 17, and the forward extensions 19 which support the tape-guiding surfaces 21. Also apparent in the FIG. 1 elevation are the tap guide pins 23 and 25, which are mounted on forward-extending projections 27 and 29.

In the opposite elevational view shown in FIG. 2, which is inverted, the dust cover 7 is shown in the forward position. Cover flaps 31 extend from openings in the cover, and a record-preventing tab 33 extends downward along the rear wall 35 in a recess 37 formed upward from the base.

As shown in FIGS. 3-7, the cover 5 has a rectangular opening 39. A lug 41 extends inward from the outer edge of the opening, and a spring 43 is integrally formed on a living hinge 45 connected to the lug. The spring has a dished shape, as generally shown in FIG. 4. Flap 31 is hinged 38 along a longitudinal edge of the opening 39, and tabs 47 on the flaps engage complementary depressions in the walls to hold the flaps closed. As shown in FIG. 3, a fulcrum bar 49 on flap 31 urges spring 43 toward a tape reel.

FIG. 5 shows the spring 43 in the opening 39 with the flap 31 and fulcrum 49 in edge elevation.

FIG. 6 shows an edge elevation of the spring 43, the flap 31 with the fulcrum 49, and the tabs 47.

As shown in FIG. 7, the tabs 47 fit in complementary openings in the wall.

FIG. 8 shows a hinged compound spring 51 with a flat portion 53 which underlies the flap 31, and a bent portion 55 which presses against a reel hub.

FIGS. 3-6 and 8 show the molded position; FIG. 7 shows the operating position of a flap and spring.

FIG. 9 is an alternate form of flap 31' and spring 51', which is integrally molded in profile on the cover.

FIG. 10 is a schematic cross-sectional representation of the flap 31' and spring 51' in closed position in the rectangular opening 39.

FIG. 11 shows the base of a standard cassette 53. When the cassette is loaded, a light source is inserted in cylindrical opening 55. Light beams 57 travel through windows in the outer walls 59 to impinge upon receivers when the light shines through clear leaders to indicate that the tape is near its end.

When a video cassette is made of translucent materials, interfering reflected light may erroneously be read by the sensors.

The cassette of the present invention has a partial cylindrical wall 61 in the front wall 63, and has an open frontal portion which may permit light scatter from the light source 65. The open frontal portion of the cassette 1 is shown in FIG. 15. The invention employs a partial or full cylinder with an opaque coating in the front wall, as shown in FIG. 14. The cylinder 67 has a closed top and lateral holes 69 or covered channels, which screen all light from the source except the direct light in the defined direction 57. Also as shown in FIGS. 16-20, the invention uses opaque coatings 71, or snap-in opaque walls with clear window openings 73. Any opaque light-screening material may be used.

Figure 18:
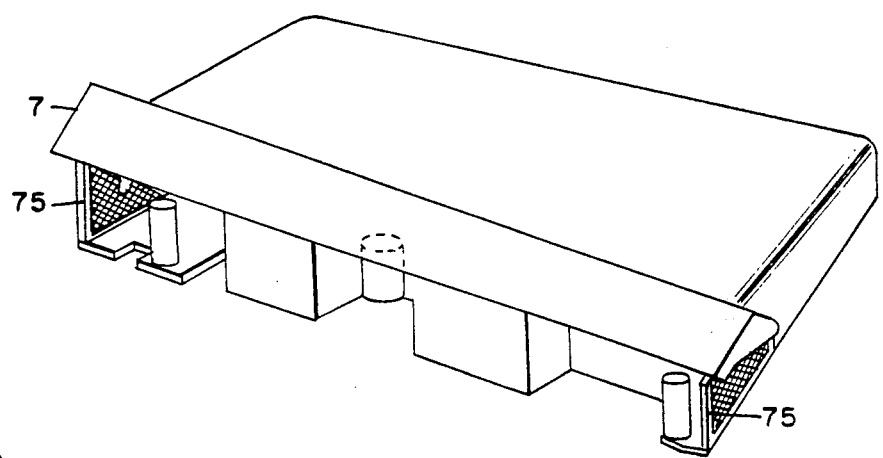
FIG. 18 is a schematic perspective view of a translucent cassette with opaque light screens of the present invention.
Figure 19:
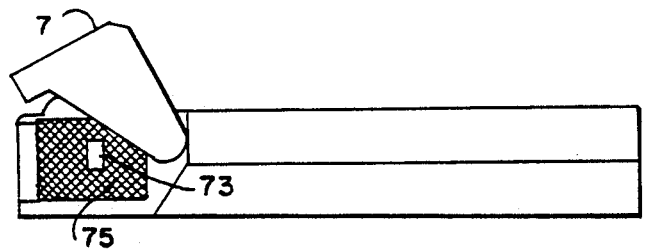
FIG. 19 is a side elevation of the opaque light screen shown in FIG. 18.
Figure 20:
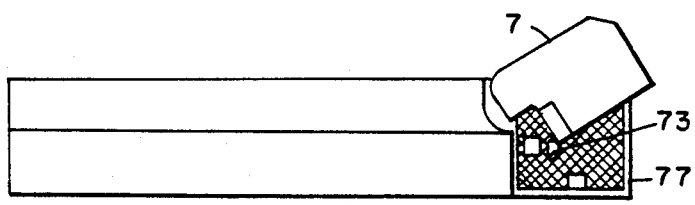
FIG. 20 is an opposite side view of the translucent cassette with an opaque light screening material and clear open window of the present invention.

As shown in FIG. 18, the screening material is on a side panel 75. FIG. 19 shows the supply side wall screen 75 with the window 73, and the FIG. 20 shows the take-up side screen 77 with the clear window 73.

Figure 21:
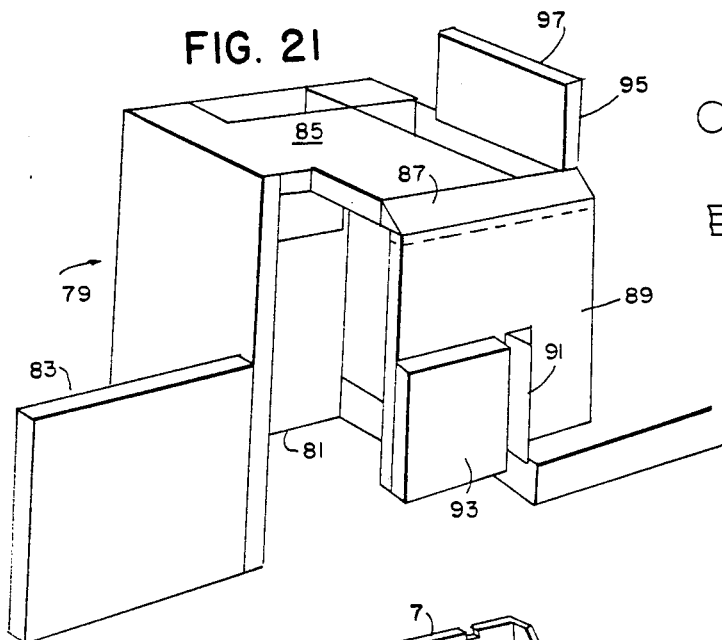
FIG. 21 is a detail of a preferred dust door cover latch.
Figure 22:
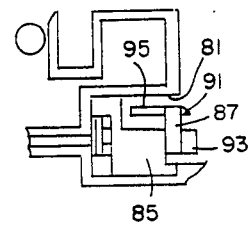
FIG. 22 is a plan view of the dust door cover latch shown in FIG. 21.

Holding the dust cover 7 closed and releasing the dust cover 7 requires a latch mechanism. In standard cassettes, the latch mechanism uses a separate sliding part and a spring and guides, which add expense to the assembly operation, and which increase the complexity of materials used in the cassette preventing recycling. The present invention uses an integral latch mechanism 79, as shown in FIGS. 21 and 22. A release recess 81 is formed with the side wall of the base. A top member 85 is cantilevered horizontally, and a living spring 87 joins a latch plate 89 to the cantilevered support 85. The latch plate carries a latch 91 and a latch release pad 93. Pressing inward on latch release pad 93 moves latch plate 89 inward and releases latch 91 from a corresponding vertical groove in the edge of the dust door. A portion of the latch plate 89 or the hinge 87 extends laterally from the support 85. A dust door return arm 95 is vertically formed on the projecting part of the latch plate 89 or the hinge 87. A the dust door 7 returns to a closed position, the inside of the dust door presses on the upper edge 97 of return arm 95, causing plate 89 to pivot outwardly, carrying latch 91 into engagement with the vertical latching groove on the dust door.

Figure 23:
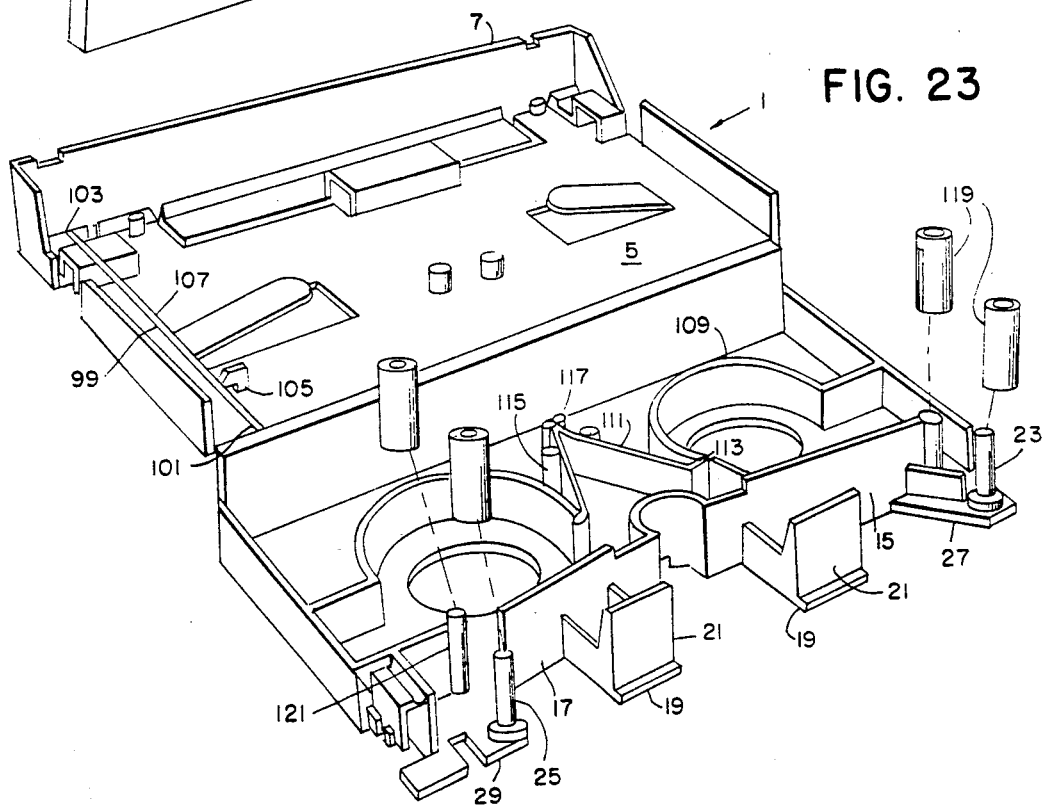
FIG. 23 is a perspective view of the low cost video cassette of the present invention showing a dust door closing spring.

As shown in FIG. 23, the low cost video cassette 1 of the present invention has a tension spring 99, which is connected at one end 101 to an inside of the cover 5, and which is connected at the other end 103 to an inside of a dust door 7. The spring 99 tends to return the dust door to a closed position. One or more hold-downs 105 hold the end portions of a spring parallel to the door. The spring is free to bend in the center 107, such as to return the spring to a normal, curved condition.

As shown in the FIG. 1, the base 3 has integrally formed tape reel pockets 109, and integrally formed brake levers 111 with brake teeth 113 on one end. The brake levers are supported on fixed pivots 115, and operator ends 117 extend oppositely from the pivots so that spreading the operator ends 117 releases the brake teeth 113 from engagement with reel teeth.

The rearwardly set front walls 15 and 17, and the projections 19 which support vertical tape guide faces 21, are clearly shown in FIG. 23. Forward-extending ledge 29 which supports tape guide roller 25, and forward extending triangular-shaped ledge 27 which supports tape guide 23, are also shown. Rollers 119 are assembled on guide pins 23, 25, 121 and 123 and freely turn thereon.

As shown in FIG. 24, the dust door 7 may be closed by a coil spring 125 fixed in a coil spring pocket 127 on a side wall 129. Free end 131 of the coil spring rests in a J-hook 133 connected to the door 7 for urging the door 7 downward into a closed position. In an alternate embodiment, as shown in FIGS. 26 and 27, a leaf spring 135, a coil spring 137, or a straight wire spring 139 may be fixed in or molded into an appropriate receiver 141 in the hinge 143 or the downward-extending portions 145 and 147 of the door mount and door respectively. FIG. 28 shows a side elevation of the dust door 7 mounting lug 145 and hinge 143.

FIG. 29 shows the brake operators or retractors 117, which extend through the wall thickness of the base 3. A retractor pin 151 extends only partially through the wall thickness into contact with the retractors to release the brake.

FIGS. 30 and 31 show a frangible anti-record tab 33 in a record groove 37, which opens downwardly in base 3. FIG. 31 shows the record tab 33 in its inverted molded position. The record tab 33 is parallel with the outer surface of the back wall 35 of the cassette.

Figure 32:
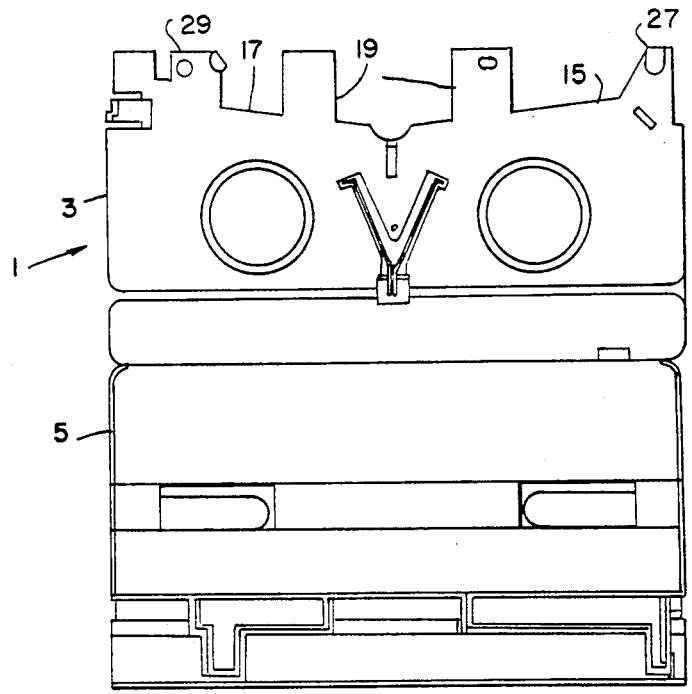
FIG. 32 shows a preferred base profile of the present invention.
Figure 33:
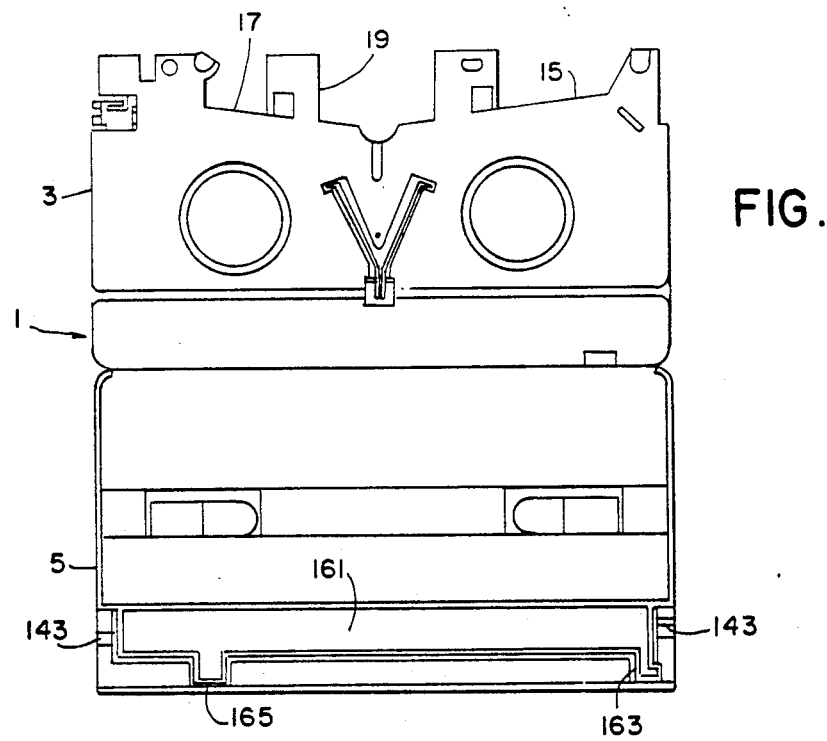
FIG. 33 shows preferred dust door hinges of the present invention.

As shown in FIGS. 32 and 33, the base has a modified profile with recessed front walls 15 and 17 and projections 19 which support the tape guide walls, and projections 27 and 29 which support the tape guide roller pins. As shown in FIG. 33, the preferred door hinges 143 are positioned at outward extremities of the door and are not positioned across the door. A shelf 161, which projects forward from the cover 5, has extensions 163 and 165 which have receivers for the tops of pins 23 and 25, which receive the tape guide rollers 119.

While the invention has been described with reference to specific embodiments, modifications and variations of the invention may be constructed without departing from the scope of the invention, which is defined in the following claims.

We claim:

1. A low cost video cassette comprising an integrally molded base, a rear wall connected to the base and extending upward from the base, a cover hinged to the top of the rear wall by an integrally formed living hinge, first and second openings in the cover, first and second springs integrally formed with the cover for extending toward the respective openings in the cover and for pressing tape reels downward toward the base, and first and second elongated flaps integrally formed with the cover and hinged along one edge to the cover and attachable along opposite edges to opposite edges of the respective cover openings for overlying the springs and forcing the springs downward into engagement with the reel hubs.

2. The apparatus of claim 1, wherein the cover is formed with first and second rectangular openings, and wherein the springs extend inward from outer edges of the openings, and wherein the springs are hinged to lugs stepped downward from the openings.

3. The apparatus of claim 2, wherein the cover further comprises a fulcrum bar for engaging the spring adjacent the spring hinge.

4. The apparatus of claim 2, wherein the spring comprises a spring having one end connected to the hinge and having a bent central portion, and having an opposite free end for contacting the reel.

5. The apparatus of claim 1, wherein the spring is connected to the cover flap and is molded in profile on the cover flap for projecting downward into the cassette toward a reel.

6. The apparatus of claim 1, wherein the base has a step approximately equal to the thickness of the base, and further comprising integrally molded oppositely extending reel locks connected to the base, the reel locks having actuator sections extending into the step, whereby the reel lock actuator sections are contacted and moved by an operator within the base thickness.

7. The apparatus of claim 1, further comprising a tape dust door connected to an edge of the cover remote from the rear wall by a living hinge and a dust door latch integrally molded on an upward extension from the base and connected thereto by a living hinge for latching one side of the dust door and holding the dust door in a closed position, the latch further comprising a return arm extending toward the dust door from the latch for contacting by the dust door as the dust door is returned to the closed position, and forcing the latch outward into latching contact with an internal ridge on a side of the dust door.

8. The apparatus of claim 7, wherein the dust door is pivoted laterally about a first hinge for selective engagement and disengagement with the dust door ridge, wherein the return arm is spaced inward from the latch, and wherein the latch and return arm are cantilevered forward from the hinge.

9. The apparatus of claim 1, wherein the base and cover are made of translucent material, and further comprising a light screen connected to a forward projection on the base for screening tape signalling light when the VCR is in use.

10. The apparatus of claim 9, wherein the light screen comprises coatings on the translucent cassette body.

11. The apparatus of claim 9, wherein the screen comprises an opaque partial cylinder with a closed top and covered channels which screen all but direct sensing light in a defined direction of light source receivers.

12. The apparatus of claim 9, wherein the cassette further comprises an opaque cylinder with a closed top and covered channels which screen all light except direct sensing light in defined directions of light source receivers.

13. The apparatus of claim 9, wherein the screens comprise first and second opaque screen walls which are snapped, pressed or welded into the cassette shell, and which have holes positioned to allow direct light from a sensing light source to shine on receivers, but which screen out all other light.

14. The apparatus of claim 9, wherein the light screen is formed by one of opaque light screening labels, paints or pigments which are applied to the cassette for blocking out light, except for direct light from a light source through a window in the screen in front of the sensing light receiver.

15. The apparatus of claim 1, further comprising a straight spring connected at a first longitudinal end to a dust door, and extending for a distance inside the cover toward the back wall, with a second end secured beneath the cover for extending and compressing along the cover and tending to close the dust door.

16. The apparatus of claim 1, further comprising downward extending ledges along opposite sides of a front edge of the cover opposite the living hinge to the rear wall, and a dust door connected to living hinges at lower extremities of the downward extending ledges, wherein the extensions and the dust door living hinges form an integral hinge attached only at opposite end portions of the front edge of the cover, and not in the middle of the cover.

17. The apparatus of claim 1, further comprising a record preventing recess formed in the bottom wall and in the rear wall and extending upward from an opening in the bottom wall, and a record permitting tab formed on the rear wall and extending downward in the record preventing recess to a position near the bottom wall.

18. The apparatus of claim 1, wherein the base comprises first and second tape guides at a front edge and a forward wall extended inward from a front edge of the base, and generally rectangular projections extending forward from the front wall to the guides for guiding the tape.

19. The apparatus of claim 18, wherein the forward projections comprise generally rectangular rhombic plan projections with rectangular forward edges and rectangular tape guides extending upward from the forward edges positioned near the middle of the front wall, and a generally triangular form lateral extension with an integrally formed upward extending tape guide pin for receiving and supporting a tape guide post near one edge portion of the front wall, a forward, generally rectangular projection, having at one corner thereof a second tape guide pin extending vertically upward therefrom for receiving a second tape guide post, and having a recess along one edge thereof for receiving a dust door latch.

* * * * *